United States Patent

[11] 3,632,907

| [72] | Inventor | Robert Leonard Gleeson<br>Burnley, England |
|---|---|---|
| [21] | Appl. No. | 878,675 |
| [22] | Filed | Nov. 21, 1969 |
| [45] | Patented | Jan. 4, 1972 |
| [73] | Assignee | Joseph Lucas (Industries) Limited<br>Birmingham, England |
| [32] | Priority | Dec. 6, 1968 |
| [33] | | Great Britain |
| [31] | | 58,153/68 |

[54] WINDSCREEN WASHER AND WIPER CONTROL SYSTEM
5 Claims, 3 Drawing Figs.

[52] U.S. Cl. .................................................. 200/4, 200/61.27
[51] Int. Cl. ...................................................... H01h 9/00, H01h 3/16
[50] Field of Search ............................................. 200/4, 61.27

[56] References Cited
UNITED STATES PATENTS

| 2,905,962 | 9/1959 | Ziegler .......................... | 200/4 X |
| 2,940,109 | 6/1960 | Weymouth, Jr. ............ | 200/4 X |
| 3,228,056 | 1/1966 | Kibler........................... | 200/4 X |
| 3,511,943 | 5/1970 | Kibler........................... | 200/61.27 X |

*Primary Examiner*—J. R. Scott
*Attorney*—Holman & Stern

ABSTRACT: A windscreen washer and wiper system for a road vehicle includes a windscreen washer unit, a windscreen wiper unit and a control switch for controlling the windscreen wiper unit and the windscreen washer unit. The control switch, in addition to controlling the windscreen wiper unit serves to operate the wiper unit when the windscreen washer unit is operated.

INVENTOR
Robert Leonard Glasson
BY Holman, Glascock
Downing & Seebold
ATTORNEYS 3,632,907

WINDSCREEN WASHER AND WIPER CONTROL SYSTEM

This invention relates to a windscreen washer and wiper system for a road vehicle.

A system according to the invention includes a windscreen washer unit, a windscreen wiper unit and a control switch for controlling the windscreen wiper unit and the windscreen washer unit, the control switch, in addition to controlling the wiper unit, serving to operate the wiper unit when the washer unit is operated.

Figure 1:
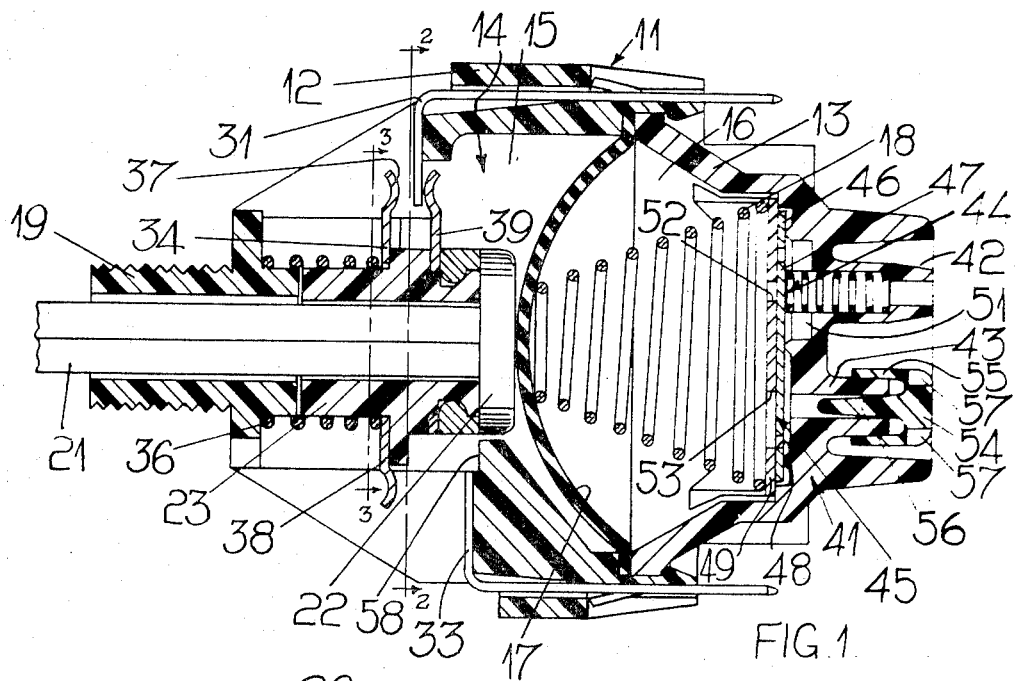
Figure 2:
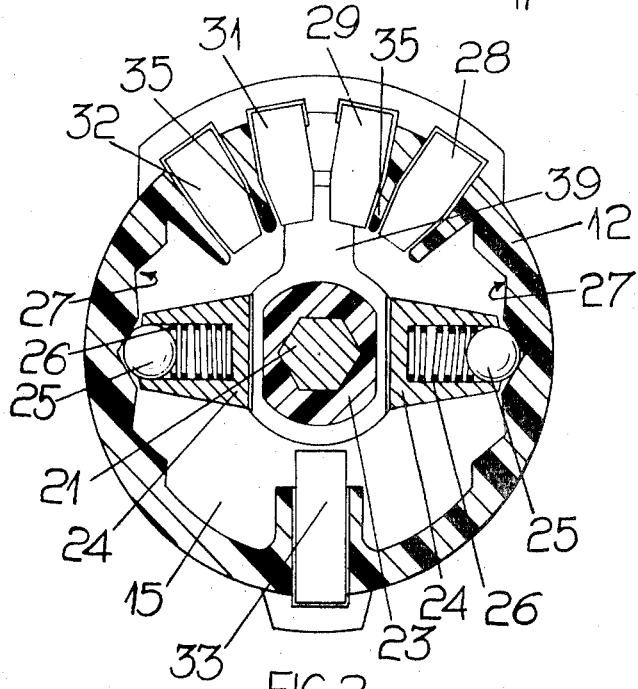
Figure 3:
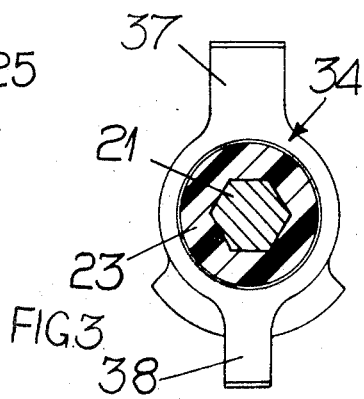

One example of the invention is illustrated in the accompanying drawings wherein:

FIG. 1 is a sectional view of an electrical switch,
FIG. 2 is a sectional view on the line 2—2 in FIG. 1, and
FIG. 3 is a part sectional view on the line 3—3 in FIG. 1.

Referring to the drawings, the switch includes a molded synthetic resin body 11 which is formed in two parts 12, 13 which are engaged with one another as a snap fit. The parts 12, 13 are dished, and so when interengaged define a compartment 14 within the casing 11. The compartment 14 is divided into two chambers 15, 16 by a resilient, domed rubber diaphragm 17 which is urged towards the part 12 of the casing 11 by a spring 18 acting between the diaphragm 17 and the casing part 13.

At its end remote from the casing part 13, the casing part 12 is formed with an integral, hollow spigot 19 within which is received a noncircular shaft 21 of a plunger 22. The shaft 21 is capable of both angular and axial movement relative to the spigot 19, nd the plunger 22 engages the diaphragm 17. Slidably mounted on the shaft 21, within the casing part 12 is a molded synthetic resin rotor 23 which includes a pair of diametrically opposite, radially outwardly extending hollow fingers 24. The rotor 23 is constrained to rotate with the shaft 21, and each of the fingers 24 carries a ball 25 which is urged outwardly of the finger by a respective spring 26 into engagement with a respective cam track 27 formed in the wall of the casing part 12.

Extending radially into the casing part 12 are four angularly spaced terminal blades 28, 29, 31 and 32 respectively, the four terminal blades lying in the same plane. MOreover also extending radially into the casing part 12, but on the opposite side of the shaft 21 from said four terminal blades is a fifth terminal blade 33, the terminal blade 33 lying in a plane parallel to the plane of the blades 28, 29, 31, 32, and between the plane of the blades 28, 29, 31, 32 and the diaphragm 17. The rotor 23 carries a conductive bridging piece 34 in such a manner that the rotor 23 is capable of rotation relative to the bridging piece 34, the bridging piece 34 being held against rotation relative to the casing 11 by a pair of shoulders 35 integral with the casing part 12. The bridging piece 34 is urged into abutting engagement with a radially outwardly directed peripheral flange on the rotor 23 by a spring 36 extending between the bridging piece 34 and the casing part 12, the spring 36 being weaker than the spring 18. The bridging piece 34 includes a pair of diametrically opposite contact blades 37, 38, which extend in a plane parallel to the planes of the terminal blades 28, 29, 31, 32 and 33, and the arrangement of the switch is such that in the rest condition of the switch the contact blade 37 is spaced from the terminal blades 29, 31 in a direction towards the spigot 19 of the casing part 12. The contact blade 37 is aligned with the terminal blades 29, 31 and is of such a width that it can engage both the blades 29, 31 simultaneously. The contact blade 38 is aligned with the terminal blade 33.

Secured to the rotor 23, on the side of said peripheral outwardly extending flange remote from the bridging piece 34 is a contact blade 39. The contact blade 39 is of the same width as the contact blade 37, but is constrained to move both axially and angularly with the rotor 23.

The casing part 13 includes an integral base 41 at its end remote from the casing part 12. The base 41 includes a pair of integral tubular spigots 42, 43 which extend outwardly from the base 31. The tubular spigots 42, 43 define respectively outlet and inlet conduits, and their passages communicate with the chamber 16 through respective oppositely orientated one-way flap valves 44, 45. The flap valves 44, 45 are defined by the base 41, a sheet of flexible material 46 having a pair of flops 47, 48 defined therein, and a rigid pressure plate 49. The base 41 is formed with a chamber 51 into which the passage of the spigot 42 extends, and the pressure plate 49 is formed with a small hole 52 aligned with the chamber 51. Within the chamber 51 is an integral, cruciform rib, and the flap 47 is movable from a position wherein it closes the hole 52, thereby closing the outlet, to a position wherein it rests on the cruciform rib, so that the outlet passage is open. The passage of the spigot 43 opens in the inner surface of the base in a small hole, which can be closed by the flap 48, and adjacent the flap 48 the pressure plate 49 is formed with a large aperture 53 which cannot be closed by the flap 48. Thus in one position of the flap 48, the flap 48 abuts against the inner surface of the base 41 thereby closing the inlet passage.

Mounted on the spigot 43 is a molded polypropylene needle valve 54 which restricts the inlet conduit. The needle valve 54 includes a cup-shaped portion 55 which is received as an interference fit on the spigot 43, and extending from the base of the cup-shaped part 55 into the passage in the spigot 43 is an integral tapered needle 56. The base of the cup-shaped part 55 is formed with apertures 57, and it will be appreciated that by varying the position of the needle valve 54 relative to the spigot 43 then the amount by which the inlet conduit is restricted can be varied.

In one practical embodiment, the switch is used to control a two-speed self-parking windscreen wiper unit, and a windscreen washer unit of a road vehicle, and the operation of the switch in such an arrangement will now be described.

The terminal blade 31 is connected to one terminal of the vehicle battery, the other terminal of the vehicle battery being grounded. The terminal blade 33 is connected through the operating motor of the windscreen washer unit to ground, and the terminal blades 29, 32 are connected respectively in the slow speed and fast speed circuits of the windscreen wiper unit. The terminal blade 28 is grounded, so that when the blade 29 and the blade 28 are electrically interconnected, then the slow speed winding of the windscreen wiper motor is short circuited, thereby achieving dynamic braking of the windscreen wiper motor. When the switch is in its rest position, with the windscreen wiper unit and the windscreen washer unit inoperative, then the parts of the switch are in the position shown in the drawings, with the exception that the rotor 23 is in a position wherein the contact blade 39 engages, and electrically interconnects the terminal blades 28, 29.

In order to operate the windscreen wiper unit of the road vehicle, at slow speed, the shaft 21 is rotated, so that the rotor 23 is moved to a position wherein the contact blade 39 bridges the terminal blades 29, 31 thereby completing the circuit to the slow speed winding of the wiper motor. Similarly in order to operate the windscreen wiper unit at high speed, the rotor is further rotated until it occupies a position wherein the contact blade 39 bridges the terminal blades 31, 32 thereby completing the circuit to the fast speed winding of the wiper motor. To stop the operation of the windscreen wiper unit in either its fast speed or its slow speed condition, the shaft 21 is rotated to move the rotor 23 to a position wherein the contact blade 39 once again bridges the blade terminals 28, 29 thereby breaking the circuit to the fast or slow speed winding of the wiper motor, and short circuiting the slow speed winding of the motor to achieve dynamic breaking. The spring-pressed balls 25 together with the cam tracks 27 define detent means for retaining the rotor 23 in any one of its three positions.

In order to operate the windscreen washer unit, the plunger 21 is moved axially towards the base 41 of the casing part 13. During initial movement of the shaft 21 the rotor 23 moves with the shaft 21, and so the contact blade 39 is moved out of engagement with whichever pair of the terminal blades 28, 29, 31, 32 it is engaging at the time the plunger 21 is moved. As previously stated, the end of the plunger 21 is engaged with the diaphragm 17, and so throughout the full range of movement of the plunger 21 towards the base 41 the diaphragm 17 is being deformed in a manner to reduce the volume of the chamber 16. Air expelled from the chamber 16 during movement of the plunger 21 escapes from the chamber 16 through the outlet conduit. As previously stated, the bridging member 34 cannot move angularly relative to the casing 11, and is aligned with the terminal blades 29, 31. Thus as the shaft 21 is moved, shortly after the contact blade 39 disengages from the terminal blades, the contact blade 37 of the bridging piece 34 engages the terminal blades 29, 31 thereby completing the circuit to the slow speed winding of the windscreen wiper motor. Thus initial movement of the plunger 21 to operate the windscreen washer unit causes the windscreen wiper unit to be energized in its slow speed condition regardless of the original condition of the windscreen wiper unit. Since the contact blade 37 is engaged with the terminal blades 29, 31, then further movement of the shaft 21 towards the base 41 causes the bridging piece 34 to tilt relative to the rotor 23, thereby stressing the spring 36. Owing to the tilting action of the bridging piece 34, the contact blade 38 of the bridging piece 34 is moved rapidly towards the terminal blade 33, during further movement of the shaft 21. Since the contact blade 37 of the bridging piece 34 is engaged with the terminal 31, then when the contact blade 38 engages the terminal blade 33, the circuit to the motor of the windscreen washer unit is completed, thereby causing operation of the windscreen washer unit. During further movement of the plunger 22, shortly after the contact blade 38 has engaged the terminal blade 33, said outwardly directed peripheral flange on the rotor 23 engages a shoulder 58 on the casing part 12 thereby preventing further movement of the rotor 23. Further movement of the plunger 22 then takes place relative to the rotor 23, and serves to further deform the diaphragm 17 against the action of the spring 18. MOvement of the plunger 22 towards the base 41 is limited in any convenient manner, for example by providing a stop on the shaft 21 which engages the outer end of the spigot 19, or by engagement of the end of the plunger 22 with the pressure plate 49.

When the plunger 22 is released, the spring 18 starts to return the diaphragm 17 and the plunger 22 to their original positions. However, the speed at which the diaphragm 17 can return to its original position is limited by the rate at which air can enter the chamber 16 through the inlet conduit, and this rate is controlled by the setting of the needle valve 54. Thus the shaft 22 is moved outwardly at a rate dependent upon the setting of the needle valve 54, and until the head of the plunger 22 once again engages the rotor 23, the bridging piece 34 is maintained in position completing the circuit to the slow speed winding of the windscreen wiper motor, and the circuit to the motor of the windscreen washer unit. During the return movement of the plunger 22, the head of the plunger 22 engages the rotor 23, and thereafter the rotor 23 moves with the shaft 21 towards the spigot 19. Such movement of the rotor 23 first disengages the contact blade 38 from the terminal blade 33 thereby stopping operation of the windscreen washer unit. The windscreen wiper unit of the road vehicle thereafter continues to operate at slow speed until the rotor 23 has been moved sufficiently far to disengage the contact blade 37 from the terminal blades 29, 31 whereupon the circuit to the slow speed winding of the windscreen wiper motor is broken. Shortly after the contact blade 37 is disengaged from the terminal blades 29, 31 the contact blade 39 is reengaged with whichever pair of the terminal blades 28, 29 is engaged prior to the movement of the shaft 21.

Thus, regardless of whether the windscreen wiper unit is in its off, its slow speed, or its fast speed condition, operation of the windscreen washer unit causes operation of the windscreen wiper unit at a slow speed. Moreover, there is a preset delay during which the windscreen wiper unit is operating at slow speed while the windscreen washer unit is operating. Furthermore, the windscreen wiper unit continues to operate at slow speed for a short time after the windscreen washer unit has been switched off, thereby ensuring that any surplus washing liquid on the windscreen of the vehicle is removed by the windscreen wipers.

Having thus described my invention what I claim as new and desire to secure by Letters Patent is:

1. A windscreen washer and wiper system for a road vehicle, the system including, an electrically operated windscreen wiper unit, an electrically operated windscreen washer unit for delivering washing liquid to a vehicle windscreen in use, and an electrical control switch, the control switch including, a body, a rotor mounted for rotation in the body, an operating member mounted for axial movement in the body, resilient means urging the operating member to a rest position, a first set of electrical contacts operable by rotation of said rotor and by axial movement of the operating member against the action of said resilient means, means connecting said first set of electrical contacts to said wiper unit, a second set of electrical contacts operable only by axial movement of the operating member against the action of said resilient means, and operable during the movement of the operating member subsequent to the operation of aid first set of electrical contacts, means connecting said second set of contacts to said washer unit, and, a pneumatic delay device operable by movement of the operating member against the action of said resilient means and determining the rate at which the operating member is returned to its rest position by said resilient means, when released, the delay device thus determining the periods of operation of said wiper unit and said washer unit after said operating member has been released, and so determine the period of time during which the wiper unit is operative after the washer unit has ceased to operate.

2. A system as claimed in claim 1 wherein the wiper unit has three operating conditions including an off condition and axial movement of the operating member against the action of said resilient means causes operation of the windscreen wiper unit in a predetermined one of the operating conditions other than the off condition, regardless of the rotational position of the rotor.

3. An electrical switch for use in a system as claimed in claim 1, comprising a body, a rotor rotatably mounted on the body, an operating member mounted for axial movement in the body, a first set of electrical contacts operable by rotation of said rotor and by axial movement of the operating member, a second set of electrical contacts operable in response to axial movement of the operating member, resilient means urging the operating member in one direction elative to the body, and a pneumatic delay mechanism operable by movement of the operating member against the action of the resilient means to delay the return of the operating member to a rest position under the action of said resilient means.

4. A switch as claimed in claim 3 wherein the operating member is coupled to the rotor so that angular movement of the operating member causes angular movement of the rotor, while the operating member can move axially relative to the rotor.

5. A switch as claimed in claim 3 wherein certain contacts in the first set of contacts are also contacts of the second set of contacts.

* * * * *